Patented June 5, 1923.

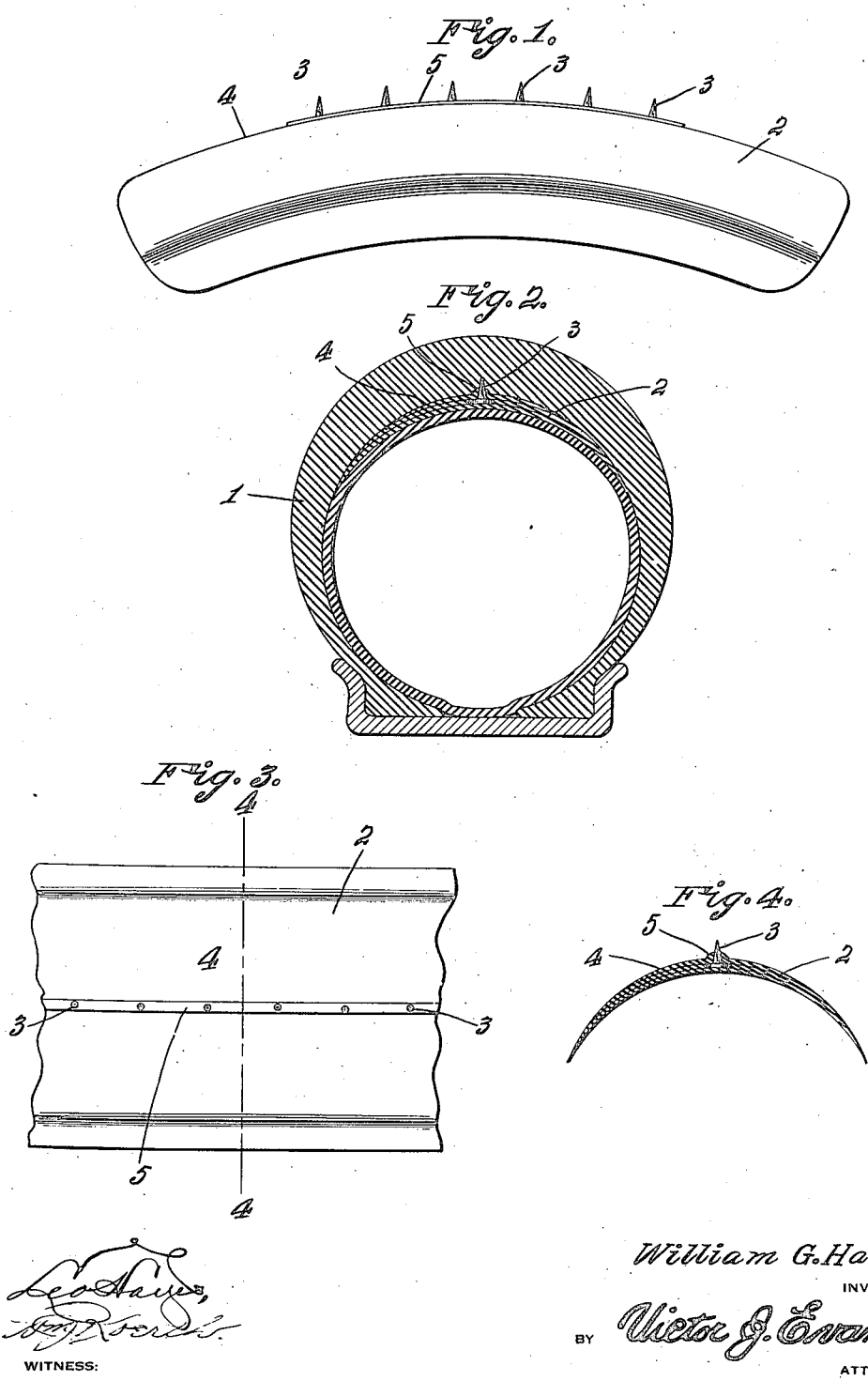

1,458,053

UNITED STATES PATENT OFFICE.

WILLIAM G. HANDLY, OF ST. ALBANS, VERMONT.

PATCH.

Application filed February 20, 1922. Serial No. 538,031.

*To all whom it may concern:*

Be it known that I, WILLIAM G. HANDLY, a citizen of the United States, residing at St. Albans, in the county of Franklin and State of Vermont, have invented new and useful Improvements in Patches, of which the following is a specification.

My present invention has reference to a self-vulcanizing patch or boot for pneumatic tires.

My object is to produce a reinforcing patch or boot for pneumatic tires which is of a nature and construction to permanently attach itself to the tire by the heated pressure to which it is subjected in the travel of the tire and which is provided with means for holding the same against movement in any direction in the tire, prior to the patch or boot being vulcanized to the tire.

The drawing which accompanies and which forms part of this specification illustrates a satisfactory embodiment of the improvement reduced to practice, and wherein:—

Figure 1 is a side elevation of the improvement.

Figure 2 is a transverse sectional view through a pneumatic tire casing illustrating the application of the improvement.

Figure 3 is a fragmentary plan view of the improvement.

Figure 4 is a sectional view on the line 4—4 of Figure 3.

Referring now to the drawings in detail, the numeral 1 designates a pneumatic tire casing of the ordinary construction in which my boot or patch is to be arranged to reinforce and strengthen the casing.

The boot or patch, indicated by the numeral 2 is made up of any desired number of layers of rubberized fabric or the like and presents a member which is arcuate in both longitudinal and transverse section. The layers are so arranged that the boot is thickest at its center and from thence gradually decreases in thickness to its edges and to its ends, its said edges and ends being feathered. In the process of manufacture, there is embedded between certain of the layers that constitute the boot or patch headed elements having pointed shanks 3, the said shanks passing through the remaining layers and providing impinging elements which enter the casing 1 to hold the patch or boot against movement therein. In addition to this, the outermost layer, indicated for distinction by the numeral 4 is centrally formed with a longitudinal rib 5, and through this rib the spaced pointed elements 3 pass. The rib 5 is designed to be embedded in the tire casing, and to assist the pointed elements 3 in holding the boot against movement in the casing.

Because of the nature of the boot and the heat to which it will be subjected when the tire is arranged on the wheel and the machine has moved a considerable distance, the boot will become vulcanized in the casing, and it is thought that the foregoing description, when taken in connection with the drawings will fully set forth the construction and advantages of the improvement to those skilled in the art to which such inventions relate.

Having described the invention, I claim:—

A self-vulcanizing boot for tire casings comprising a flexible member which is arcuate in both longitudinal and transverse section, thickest at its center and feathered at its ends and edges, said boot being made up of layers of self-vulcanizing rubber material and having embedded between the layers the heads of pointed elements, said elements passing through the outer layers and being disposed in spaced relation at the center of the boot, and the outermost layer of the boot being centrally formed with a longitudinally extending rib through which the pointed elements pass and said rib being of a less length than that of the boot.

In testimony whereof I affix my signature.

WILLIAM G. HANDLY.